United States Patent [19]

Dautzenberg et al.

[11] 4,244,807

[45] Jan. 13, 1981

[54] PROCESS FOR THE PREPARATION OF A HYDROCARBON MIXTURE RICH IN AROMATICS

[75] Inventors: Frits M. Dautzenberg; Martinus M. P. Janssen, both of Amsterdam, Netherlands

[73] Assignee: Shell Oil Company, Houston, Tex.

[21] Appl. No.: 40,808

[22] Filed: May 21, 1979

[30] Foreign Application Priority Data

May 25, 1978 [NL] Netherlands ................... 7805671

[51] Int. Cl.³ .............................................. C10G 63/04
[52] U.S. Cl. ...................................... 208/66; 208/79; 208/92; 252/449; 252/459
[58] Field of Search ................................. 208/62–66

[56] References Cited

U.S. PATENT DOCUMENTS

| | | | |
|---|---|---|---|
| 3,700,585 | 10/1972 | Chen et al. | 208/111 |
| 3,702,886 | 11/1972 | Argaver et al. | 423/328 |
| 3,767,568 | 10/1973 | Chen | 208/134 |
| 3,770,614 | 10/1973 | Grayen | 208/62 |
| 3,893,906 | 7/1975 | Garwood et al. | 208/111 |
| 3,894,939 | 7/1975 | Garwood et al. | 208/111 |
| 3,928,174 | 12/1975 | Bonacci et al. | 208/80 |
| 3,945,913 | 3/1976 | Brennan et al. | 208/137 |
| 3,950,241 | 4/1976 | Bonacci et al. | 208/64 |
| 4,208,305 | 6/1980 | Kouwenhoven et al. | 423/328 |

FOREIGN PATENT DOCUMENTS 7613957 12/1977 Netherlands .............. 423/328

OTHER PUBLICATIONS

McNicol et al., "Spectroscopic Studies of Zeolite Synthesis", Journal of Physical Chemistry, 78 (23) 1972.

*Primary Examiner*—Delbert E. Gantz
*Assistant Examiner*—G. E. Schmitkons
*Attorney, Agent, or Firm*—Ronald R. Reper

[57] ABSTRACT

A process is disclosed for the preparation of a hydrocarbon mixture rich in aromatics from a gasoline boiling range hydrocarbon mixture low in aromatics which comprises catalytically reforming said hydrocarbon mixture followed by contacting the reformate with certain crystalline silicates at an elevated temperature.

15 Claims, No Drawings

PROCESS FOR THE PREPARATION OF A HYDROCARBON MIXTURE RICH IN AROMATICS

BACKGROUND OF THE INVENTION

The invention relates to a process for the preparation of a hydrocarbon mixture rich in aromatics from a hydrocarbon mixture that is low in aromatics and which boils in the gasoline range.

Hydrocarbon mixtures rich in aromatics are used on a large scale as gasoline. Separate aromatic compounds may be isolated from them by distillation and extraction, such as benzene, toluene, the xylenes, and ethylbenzene which are used on a large scale as raw materials for the chemical industry. Until recently, hydrocarbon mixtures rich in aromatics which were suitable for use in the above-mentioned applications were mainly prepared by catalytic reforming of hydrocarbon mixtures low in aromatics and boiling in the gasoline range. The latter hydrocarbon mixtures consist substantially of unbranched and branched paraffins and naphthenes. In the catalytic reforming of these hydrocarbon mixtures, a number of reactions occur of which the principal ones are isomerization and cyclization of paraffins, conversion of five-membered ring naphthenes into six-membered ring naphthenes and dehydrogenation of six-membered ring naphthenes into aromatics. Although one of the principal reactions in catalytic reforming is the conversion of unbranched paraffins, the reformate still contains a considerable quantity of these compounds. When the reformate is used as motor gasoline, the presence of these compounds is undesired because of their low octane number. In the past, it has already been proposed to remove unbranched paraffins present in reformates by selective cracking. A drawback is here, however, that cracked products which arise from the unbranched paraffins, boil below the gasoline range so that this treatment is detrimental to the gasoline yield. The use of the reformate as the feed for the preparation of $C_8$ aromatics by distillation and extraction involves the serious drawback that the remaining hydrocarbon mixture is less suitable as gasoline because it does not contain any $C_8$ aromatics which are very valuable gasoline components. It would therefore be desirable to have available a process which offers the possibility of converting certain components present in the reformate into $C_8$ aromatics so that the $C_8$ aromatics originally present in the reformate are preserved as gasoline components.

In an investigation concerning the preparation of hydrocarbon mixtures rich in aromatics which are suitable as motor gasolines with a high octane number or as the source for the recovery of $C_8$ aromatics, starting from hydrocarbon mixtures low in aromatics with the use of catalytic reforming, the applicants have found that the above problems can be solved by subjecting the reformate to a conversion using as the catalyst certain crystalline silicates which have recently been synthesized as described in Netherlands patent application No. 7,613,957 incorporated herein by reference.

It has been found that by contacting a reformate or a fraction thereof at elevated temperature with a catalyst containing one of these crystalline silicates, unbranched paraffins present therein and monoethyl paraffins are cracked, and that the fragments so obtained unite by alkylation with the aromatics present in the reformate. In this way, a considerable increase in octane number is obtained without significantly cutting the gasoline yeild. An attractive aspect of the process is that, in addition to unbranched paraffins, monoethyl paraffins also disappear from the reformate since the latter paraffins have an octane number higher than the unbranched paraffins have, but still considerably lower than the aromatics and highly branched paraffins have. It has further been found that by contacting a heavy fraction of a reformate, which fraction contains $C_9+$ aromatics at elevated temperature with a catalyst containing one of these crystalline silicates, disproportionation of the $C_9+$ aromatics occurs, whereby $C_8$ aromatics are formed in high yield. The $C_8-$ fraction of the reformate which comprises the $C_8$ aromatics formed in the catalytic reforming makes an excellent motor gasoline.

SUMMARY OF THE INVENTION

The present invention therefore relates to a process for the preparation of a hydrocarbon mixture rich in aromatics from a hydrocarbon mixture that is low in aromatics and which boils in the gasoline range which process comprises (a) catalytically reforming said hydrocarbon mixture, and
(b) contacting at least a portion of the product of step (a) with a catalyst containing crystalline silicates characterized as follows:
  (i) They are thermally stable to temperatures above 600° C.
  (ii) After dehydration at 400° C. in vacuum, they are capable of adsorbing more than 3% w water at 25° C. and saturated water vapor pressure.
  (iii) In dehydrated form, they have the following overall composition, expressed in moles of the oxides:

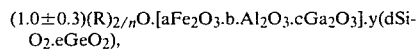

$(1.0\pm0.3)(R)_{2/n}O.[aFe_2O_3.bAl_2O_3.cGa_2O_3].y(dSiO_2.eGeO_2)$, where:
R = one or more mono or bivalent cations,
$a \geq 0.1$,
$b \geq 0$,
$c \geq 0$,
$a+b+c=1$,
$y \geq 10$,
$d \geq 0.1$,
$e \geq 0$,
$d+e=1$, and
n = the valency of R.

DESCRIPTION OF PREFERRED EMBODIMENTS

In the process according to the invention, it is a hydrocarbon fraction low in aromatics and boiling in the gasoline range which should in the first place be catalytically reformed. The catalytic reforming is carried out in the presence of hydrogen and a catalyst which contains one or more noble metals of Group VIII on a porous carrier. Suitable conditions for carrying out the catalytic reforming are a temperature of from 400° to 600° C., a pressure of from 5 to 50 bars, and a space velocity of from 0.5 to 10 l.l$^{-1}$.h$^{-1}$. The catalytic reforming is preferably carried out at a temperature of from 450° to 550° C., a pressure of from 10 to 30 bars and a space velocity of from 1 to 5 l.l$^{-1}$.h$^{-1}$. Very suitable catalysts for the reforming contain from 0.01 to 3% w and preferably 0.1 to 1% w of one or more noble metals of Group VIII, in particular platinum, and, in addition, from 0.01 to 5% w and preferably from 0.05 to 2% w of one or more additional metals with an electronegativity between 1.6 and 2.0, and in particular, rhenium or germanium. A very suitable carrier for the reforming catalysts is alumina. The catalyst contains preferably from 0.1 to 3% w and in particular from 0.5 to 1.5% w halogen, preferably chlorine.

The preparation of aromatic gasolines by catalytic reforming is in practice started both from hydrocarbon mixtures low in aromatics and boiling over the full gasoline range (so-called full range naphthas) and from hydrocarbon mixtures low in aromatics and containing only light or only heavy components which can be separated from the full range naphthas by distillation.

The process according to the invention is preferably started with a full range naphtha. Some attractive ways for the preparation of aromatic gasolines according to the invention with a full range naphtha as the starting material are given below:

(a) A full range naphtha is catalytically reformed and the reformate is contacted at an elevated temperature with the catalyst containing the silicate.

(b) A full range naphtha is catalytically reformed; the reformate is separated by distillation into a light reformate and a heavy reformate and the light reformate is contacted at an elevated temperature with the catalyst containing the silicate.

(c) A full range naphtha is separated by distillation into a light naphtha and a heavy naphtha; the light naphtha and the heavy naphtha are separately reformed and the reformate obtained from the light naphtha is contacted at elevated temperature with the catalyst containing the silicate.

(d) A full range naphtha is separated by distillation into a light naphtha and a heavy naphtha; the light naphtha is catalytically reformed; the reformate is mixed with the heavy naphtha and the mixture is contacted at an elevated temperature with the catalyst containing the silicate.

(e) A full range naphtha is separated by distillation into a light naphtha and a heavy naphtha; the light naphtha and the heavy naphtha are separately reformed; the reformates are mixed and the mixture is contacted at an elevated temperature with the catalyst containing the silicate.

(f) A full range naphtha is separated by distillation into a light naphtha and a heavy naphtha; the light naphtha and the heavy naphtha are separately reformed; the reformate prepared from the heavy naphtha is separated by distillation into a light reformate and a heavy reformate, the light reformate is mixed with the reformate prepared from the light naphtha and the mixture is contacted at an elevated temperature with the catalyst containing the silicate.

In the process according to the invention, the yield of aromatic gasoline can be considerably increased if a light hydrocarbon mixture from an external source and substantially consisting of paraffins, such as a $C_5+$ straight run naphtha or a UDEX raffinate, is added to the reformate that is contacted at elevated temperature with the catalyst containing the silicate. The paraffin cracking products alkylate the aromatics present in the reformate. The new crystalline silicates which have the property of catalyzing the afore-mentioned conversions are characterized as follows:

(a) They are thermally stable to temperatures above 600° C.

(b) After dehydration at 400° C. in vacuum, they are capable of adsorbing more than 3% w water at 25° C. and saturated water vapor pressure.

(c) In dehydrated form, they have the following overall composition, expressed in moles of the oxides:

$$(1.0\pm0.3)(R)_{2/n}O.[aFe_2O_3.b.Al_2O_3.cGa_2O_3].y(dSiO_2.eGeO_2),$$

where:
R = one or more mono or bivalent cations,
$a \geq 0.1$,
$b \geq 0$,
$c \geq 0$,
$a+b+c=1$,
$y \geq 10$,
$d \geq 0.1$,
$e \geq 0$,
$d+e=1$, and
n = the valency of R.

Silicate-containing catalysts according to the invention have been found to be very suitable for use in a process to reduce the pour point of heavy hydrocarbon oils, such as gas oils and lubricating oils. When the heavy hydrocarbon oil is contacted at an elevated temperature with a catalyst according to the invention, selective cracking of the unbranched paraffins present therein occurs. This property of the catalysts can successfully be utilized in the process according to the invention. By adding a heavy hydrocarbon oil with a high pour point to the reformate that is contacted according to the invention at elevated temperature with the catalyst containing the silicate, not only a heavy hydrocarbon oil with a reduced pour point is obtained, but also an aromatic gasoline at a much higher yield than would have been the case in the absence of the heavy hydrocarbon oil. Apparently, alkylation of the aromatics present in the reformate takes place by means of the cracking products formed in the selective cracking of the unbranched paraffins present in the heavy hydrocarbon oil.

As previously stated, the process according to the invention is very suited not only to the preparation of aromatic hydrocarbon mixtures destined for use as motor gasoline, but also to the preparation of aromatic hydrocarbon mixtures destined for use as the source for the recovery of separate aromatic compounds, such as benzene, toluene, and $C_8$ aromatics, in particular, paraxylene.

Some attractive ways for the preparation of benzene, toluene, and $C_8$ aromatics according to the invention with a full range naphtha as the starting mineral are given below:

(a) A full-range naphtha is catalytically reformed; the reformate is separated by distillation into a $C_8-$ fraction and a $C_9+$ fraction; the $C_9+$ fraction is contacted at an elevated temperature with the catalyst containing the silicate; from the product thus obtained, benzene, toluene, $C_8$ aromatics, and a $C_9+$ residual fraction are separated by distillation and the $C_9+$ residual fraction is recycled to the reaction zone which holds the catalyst containing the silicate.

(b) This preparation proceeds in substantially the same way as described under (a) with the difference that now an additional quantity of benzene, toluene, and $C_8$ aromatics is prepared from the $C_8-$ fraction by extracting the $C_8-$ fraction and distilling the extract.

(c) A full range naphtha is catalytically reformed and the reformate is split up in the first separation section into a $C_5-$ fraction, a $C_6/C_7$ fraction, and a $C_7+$ fraction. The $C_6/C_7$ fraction and part of the $C_7+$ fraction are separately contacted at an elevated temperature with the catalyst containing the silicate. The product obtained in the conversion of the $C_6/C_7$ fraction is separated into a $C_2-$ fraction and a $C_3+$ fraction, and the $C_3+$ fraction is recycled to the first separation section. Form the product obtained in the conversion of the $C_7+$ fraction, benzene, toluene, and $C_8$ aromatics are separated and the remainder is recycled to the first separation section. From the $C_5-$ fraction, LPG is separated.

The conversion of the heavy reformate can very conveniently be carried out in a reaction zone which holds a suspension of the catalyst containing the silicate at a temperature of from 475° to 625° C., a pressure of from 1 to 3 bars, a catalyst/oil weight ratio of from 4 to 25, and a residence time of from 2 to 15 seconds. In addition to a liquid product rich in benzene, toluene, and xylenes, a gaseous product is obtained which is rich in light olefins and isoparaffins and which is very suitable for use as the feed for an alkylation process for the preparation of gasoline.

In addition to their catalytic activity in the cracking of unbranched and monomethyl-branched paraffins in the alkylation of aromatics and in the disproportionation of $C_9+$ aromatics, the crystalline silicates according to the invention have two other interesting properties. In the first place, catalysts based on silicates according to the invention have been found to show a high activity in the preparation of paraxylene by isomerization of orthoxylene and metaxylene. It has further been found that silicates according to the invention are capable of adsorbing paraxylene and ethylbenzene very selectively from a mixture containing these $C_8$ aromatics together with orthoxylene and metaxylene. These properties of the crystalline silicates can successfully be utilized in the process for the preparation of benzene, toluene, and $C_8$ aromatics as described above under (a) to (c). For this process yields a mixture of $C_8$ aromatics in which each of the four isomers is present. Of these isomeric $C_8$ aromatics, the paraxylene is by far the most important since it is used on a large scale for the preparation of terephthalic acid. In the processes mentioned under (a) to (c), paraxylene and ethylbenzene are preferably separated as the end products and orthoxylene and metaxylene (or only metaxylene if orthoxylene is desired as the end product) are converted by isomerization into paraxylene. The separated ethylbenzene may be used as the base material for the preparation of styrene or as gasoline component. The separation of the mixture of isomeric $C_8$ aromatics is preferably carried out by adsorption into a crystalline silicate according to the invention. Paraxylene and ethylbenzene are adsorbed in this process. The mixture of paraxylene and ethylbenzene may be separated further by crystallization. The mixture of orthoxylene and metaxylene is preferably recycled to the reactor in which the conversion of the heavy part of the reformate in presence of the catalyst containing the silicate takes place.

In the process according to the invention, it is preferred to use crystalline silicates in which no gallium and germanium are present. In other words, silicates of which, in the above-mentioned overall composition, c and e are 0, as described in Netherlands patent application No. 7,613,957. Further, preference is given to the use of silicates of which, in the above-mentioned overall composition, a is at least 0.5. It should be noted that in the silicates used in the process according to the invention, y is preferably less than 600 and, in particular, less than 300. Finally, in the process according to the invention, preference is given to silicates whose x-ray powder diffraction pattern has, inter alia, the reflections given in Table A of Netherlands patent application No. 7,613,957 (U.S. Ser. No. 858,136 now U.S. Pat. No. 4,208,305).

The crystalline silicates which are used as the catalyst in the process according to the invention are usually prepared from an aqueous mixture as the starting material which contains the following compounds in a certain ratio: one or more compounds of an alkali metal; one or more compounds containing an organic cation or from which such a cation is formed during the preparation of the silicate; one or more silicon compounds; one or more iron compounds; and, optionally, one or more aluminium, gallium, and/or germanium compounds. The preparation is effected by maintaining the mixture at an elevated temperature until the silicate has been formed and then separating the crystals of the silicate form the mother liquor. Before being used in the process according to the invention, the organic cations introduced during the preparation should be converted by calcining into hydrogen ions. In the process, it is preferred to use silicates whose alkali metal content is less than 1% w, and in particular, less than 0.05%w. Such silicates can be prepared from the above-mentioned calcined silicates by ion exchange, for instance, with an aqueous solution of an ammonium salt followed by calcining.

The conversion of the reformate in the presence of the catalyst containing the silicate according to the invention is preferably carried out at a temperature of from 250° and 550° C. and, in particular, of from 250° to 450° C., a pressure of from 5 to 225 bar and, in particular, of from 10 to 150 bar and a space velocity of from 1 to 250 $l.l^{-1}.h^{-1}$ and, in particular, of from 1 to 100 $l.l^{-1}.h^{-1}$. The conversion is preferably carried out in the presence of hydrogen. It is further preferred that the catalysts containing the silicate incorporate one or more metals having hydrogenation activity. Metals suitable for this purpose are, for instance, nickel and palladium.

The invention will now be explained with the following example.

EXAMPLE

A crystalline iron-aluminium silicate (silicate A) was prepared as follows: A mixture of $Fe(NO_3)_3$, $Al(NO_3)_3$, $SiO_2$, $NaNO_3$, and $[(C_3H_7)_4N]OH$ in water with the molar composition $Na_2O.4.5[(C_3H_7)_4N]_2O.0.5Al_2O_3.0.5Fe_2O_3.29.1SiO_2.428H_2O$ was heated for 48 hours in an autoclave at 150° C. under autogenous pressure. After the reaction mixture had cooled down, the silicat formed was filtered off, washed with water until the pH of the wash water was about 8, and dried for two hours at 120° C. Silicate A, thus prepared, had the following chemical composition: $0.86[(C_3H_7)_4]_2O.0.3Na_2O.0.5Fe_2O_3.0.45Al_2O_3.32SiO_2.8H_2O$. The silicate had an x-ray powder diffraction pattern substantially as given in Table B of Netherlands patent application No. 7,613,957. The silicate was thermally stable to temperatures higher than 1,000° C. and was capable, after dehydration at 400° C., of adsorbing in vacuum 7.8% w water at 25° C. and saturated water vapor pressure. With silicate A as the starting material, silicate B was prepared by, successively, calcining silicate A at 500° C., boiling with 1.0 molar NH$_4$NO$_3$ solution, washing with water, boiling again with 1.0 molar NH$_4$NO$_3$ solution and washing, drying at 120° C., and calcining at 500° C.

A C$_5$−200° C. gasoline fraction which consisted of 70%w paraffins, 23%w naphthenes, and 7%w aromatics was catalytically reformed by contacting it at a temperature of 495° C., a hydrogen partial pressure of 10 bar, a space velocity of 1.8 l.l$^{-1}$.h$^{-1}$, and a hydrogen/hydrocarbon molar ratio of 8:1 with a catalyst which contained the metal combination platinum-rhemium on alumina as the carrier. From the reformate, a C$_5$−200° C. gasoline draction was separated which consisted of 36.2%w paraffins, 3.4%w naphthenes, 17.0%w C$_6$ and C$_7$ aromatics, and 43.4%w C$_8$+aromatics. This gasoline fraction had an octane number (RON-O) of 90.3 and the iso/normal weight ratio of the C$_7$ paraffins was 2.4. The C$_5$−200° C. gasoline fraction separated from the reformate was catalytically converted by contacting it in the presence of hydrogen at a temperature of 320° C., a total pressure of 28 bar, a space velocity of 5 l.l$^{-1}$.h$^{-1}$, and a hydrogen/hydrocarbon molar ratio of 2:1 with silicate B. From the reaction product, a C$_5$−200° C. gasoline fraction was separated in a yield of 91%w which consisted of 30.6%w paraffins, 3.8%w naphthenes, 16.7%w C$_6$ and C$_7$ aromatics, and 48.9%w C$_8$+aromatics. This gasoline fraction had an octane number (RON-O) of 97.7 and the iso/normal weight ratio of the C$_7$ paraffins was 5.7.

What is claimed is:

1. A process for the preparation of a hydrocarbon mixture rich in aromatics from a hydrocarbon mixture low in aromatics and boiling in the gasoline range, which comprises
   (a) catalytically reforming said hydrocarbon mixture; and
   (b) contacting at least part of the reformate from step (a) at a temperature from 250° to 625° C. with a catalyst containing a crystalline silicate, which
      (i) is thermally stable to temperatures above 600° C.,
      (ii) after dehydration at 400° C. in vacuum, is capable of adsorbing more than 3%w water at 25° C. and saturated water vapor pressure, and
      (iii) in dehydrated form, has the following overall composition, expressed in moles of the oxides:

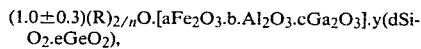

$(1.0 \pm 0.3)(R)_{2/n}O.[aFe_2O_3.b.Al_2O_3.cGa_2O_3].y(dSiO_2.eGeO_2)$, where
R = one or more mono or bivalent cations,
a > 0.5,
b ≧ 0,
c ≧ 0,
a + b + c = 1,
y = 10–300
d ≧ 0.1,
e ≧ 0,
d + e = 1, and
n = the valency of R.

2. A process according to claim 1 wherein step (a), the catalytic reforming, is carried out by contacting the hydrocarbon mixture low in aromatics together with hydrogen at a temperature of from 400° to 600° C., a pressure of from 5 to 50 bar, and a space velocity of from 0.5 to 10 l.l$^{-1}$.h$^{-1}$ with a catalyst containing from 0.01 to 3%w of one or more additional metals with an electronegativity between 1.6 and 2.0 and from 0.1 to 3%w halogen on a porous carrier.

3. A process according to claim 2 wherein the catalytic reforming is carried out at a temperature of from 450° to 550° C., a pressure of from 10 to 30 bar, and a space velocity of from 1 to 5 l.l$^{-1}$.h$^{-1}$ and in the presence of a catalyst containin from 0.1 to 1%w platinum, from 0.05 to 2% w rhenium or germanium, and from 0.5 to 1.5%w chlorine on alumina as the carrier.

4. A process according to claim 1 wherein step (b), the contacting of the reformate, is carried out at a temperature of from 250° to 550° C., a pressure of from 5 to 225 bar, and a space velocity of from 0.1 to 250 l.l$^{-1}$.h$^{-1}$.

5. A process according to claim 1 wherein in step (b), the catalyst containing the silicate comprises one or more metals having hydrogenation activity.

6. A process according to claim 1 wherein in the formula which gives the overall composition of the silicate, a is at least 0.5.

7. A process according to claim 1 wherein in step (a), a full range naphtha is catalytically reformed, that the reformate is separated by distillation into a light reformate and a heavy reformate and that the light reformate is used as feed to step (b).

8. A process according to claim 1 wherein prior to step (a), a full range naphtha is separated by distillation into a light naphtha and a heavy naphtha that the light naphtha and the heavy naphtha are separately reformed in step (a) and that the reformate obtained from the light naphtha is used as feed to step (b).

9. A process according to claim 1 which comprises separating a full range naphtha by distillation into a light naphtha and a heavy naphtha, catalytically reforming in step (a) and the light naphtha, and mixing the reformate with the heavy naphtha, contacting said mixture in step (b) at an elevated temperature with the catalyst containing the silicate.

10. A process according to any one of claims 7–9 wherein a light hydrocarbon mixture consisting substantially of paraffins is added to the reformate which is contacted at an elevated temperature with the catalyst containing the silicate.

11. A process according to claim 1 which comprises catalytically reforming a full range naphtha in step (a), separating the reformate by distillation into a C$_8$−fraction and a C$_9$+fraction, contacting the C$_9$+fraction in step (b) at an elevated temperature with the catalyst containing the silicate, separating from the product of step (b) by distillation, benzene, toluene, C$_8$ aromatics, and a C$_9$+residual fraction, and recycling the C$_9$+residual fraction to step (b).

12. A process according to claim 1 which comprises catalytically reforming a full range naphtha, splitting the reformate in the first separation section into a C$_5$−fraction, a C$_6$/C$_7$ fraction, and a C$_7$+fraction, contacting separately the C$_6$/C$_7$ fraction and part of the C$_7$+fraction in step (b) at an elevated temperature with the catalyst containing the silicate, separating the product obtained in the conversion of the C$_6$/C$_7$ fraction into a C$_2$−fraction and a C$_3$+fraction and recycling the C$_3$+fraction to the first separation section, separating benzene, toluene, and C$_8$ aromatics from the product obtained in the conversion of the C$_7$+fraction while recycling the remainder of said product to the first separation section, and separating liquified petroleum gas from the C$_5$−fraction.

13. A process according to any one of claims 11 or 12 which comprises carrying out the conversion of the heavy reformate of step (b) in a reaction zone which holds a suspension of the catalyst containing the silicate at a temperature of from 475° to 625° C., a pressure of from 1 to 3 bar, a catalyst/oil weight ratio of from 4 to 25, and a residence time of from 2 to 15 seconds.

14. A process according to claim 11 or 12 which comprises separating from the mixture of $C_8$ aromatics obtained, paraxylene and ethylbenzene as the end products and that of the remaining mixture of orthoxylene and metaxylene at least the metaxylene is recycled to the reaction zone of step (b) in which the conversion of the heavy part of the reformate in presence of the catalyst containing the silicate takes place.

15. A process according to claim 14 which comprises separating paraxylene and ethylbenzene from the mixture of $C_8$ aromatics by adsorption onto a silicate as defined in claim 1.

* * * * *